United States Patent [19]

Ogata et al.

[11] Patent Number: 4,810,773

[45] Date of Patent: Mar. 7, 1989

[54] METHOD FOR PRODUCING POLYARYLENE SULFIDE WITH LITHIUM HALIDE CATALYST

[75] Inventors: Norio Ogata; Hiroyasu Yamato; Minoru Senga, all of Ichihara, Japan

[73] Assignee: Idemitsu Petrochemical Co., Ltd., Tokyo, Japan

[21] Appl. No.: 894,369

[22] Filed: Aug. 5, 1986

[30] Foreign Application Priority Data

| Aug. 20, 1985 [JP] | Japan | 60-182755 |
| Oct. 21, 1985 [JP] | Japan | 60-234930 |
| Dec. 27, 1985 [JP] | Japan | 60-294647 |
| Feb. 12, 1986 [JP] | Japan | 61-28322 |

[51] Int. Cl.$^4$ .................................. C08G 75/16
[52] U.S. Cl. .................................. 528/388; 528/212
[58] Field of Search .......................... 528/388, 212

[56] References Cited

U.S. PATENT DOCUMENTS 4,525,579  6/1985  Idel et al. ...................... 528/388

FOREIGN PATENT DOCUMENTS 1056226  1/1967  United Kingdom.

*Primary Examiner*—Harold D. Anderson
*Attorney, Agent, or Firm*—Browdy & Neimark

[57] ABSTRACT

Disclosed is a method for producing a polyarylene sulfide comprising contacting a dihalogenated aromatic compound with an alkali metal sulfide in a polar solvent, wherein a halogenated aromatic compound containing active hydrogen is present in the reaction system.

12 Claims, No Drawings

4,810,773

METHOD FOR PRODUCING POLYARYLENE SULFIDE WITH LITHIUM HALIDE CATALYST

FIELD OF THE INVENTION

The present invention relates to a method for producing a polyarylene sulfide. More particularly, the present invention relates to a method for producing a polyarylene sulfide which can easily provide a polyarylene sulfide having a high molecular weight that shows a low flowability when melted and contains only a small amount of a contaminant salt.

BACKGROUND OF THE INVENTION

Polyarylene sulfides such as a polyphenylene sulfide are generally thermoplastic resins although some of them have a thermosetting property, and have excellent properties desired for engineering plastics such as high resistance to chemicals, good mechanical properties over a wide range of temperature and a high stiffness at high temperatures.

It is known that polyarylene sulfides can generally be produced by polymerizing a dihalogenated aromatic compound such as p-dichlorobenzene with an alkali metal sulfide such as sodium sulfide in a polar solvent (cf. Japanese Patent Publication No. 12240/1977).

However, conventional polyarylene sulfides have a low molecular weight and thus to obtain a high molecular weight product it has been necessary to cure the low molecular weight polyarylene sulfides by heat treatment, and that operation has been complex with the result being an expensive final product.

Heretofore, there has been known a method for producing a polyphenylene sulfide having a high molecular weight in which a lithium halide is used as a catalyst as described in, for example, U.S. Pat. No. 4,038,263.

However, this prior art method is disadvantageous since it cannot provide a polyphenylene sulfide having such a high molecular weight that no heat treatment of the resultant polymer is needed.

Further, there has been known methods for producing branched chain polyphenylene sulfides having high molecular weights in which a compound containing three or more halogen atoms are present in the reaction system as described in, for example, Japanese Patent Publication No. 87919/1979 and Japanese Patent Application (OPI) No. 197430/1984.

These methods, however, are also disadvantageous in that the resultant polymers tend to gel easily so that there occur problems on productivity and quality of the products. In addition, if the resultant polymers have a high flowability it is difficult to smoothly carry out molding of the polymers into various shaped products such as films, fibers, molded articles due to the fact that the polymers partly gel.

Another problem of the above-mentioned conventional methods for producing polyarylene sulfides is that the polyarylene sulfide produced contains a large amount of one or more salts such as sodium chloride which are by-produced during the polymerization reaction, and when the polyarylene sulfide is used as a material for parts of electric and electronic devices the insulation resistance to humidity of circuits is decreased, resulting in the occurrence of misoperation.

SUMMARY OF THE INVENTION

An object of the present invention is to provide a novel method for producing a polyarylene sulfide having a high molecular weight and showing a low flowability when it is melted.

Another object of the present invention is to provide a method for producing a polyarylene sulfide having a high molecular weight which method enables one to obtain a high molecular weight polymer by a simple polycondensation reaction without needing heat treatment of a polyarylene sulfide of a low molecular weight to cure it.

Still another object of the present invention is to provide a method for producing a polyarylene sulfide in which the amount of salt by-produced during the polycondensation reaction is decreased.

Yet another object of the present invention is to provide a method for producing a polyarylene sulfide which is stable and does not cause gelation.

Further object of the present invention is to provide a method for producing a polyarylene sulfide which is suitable as a material for parts of electric and electronic devices.

As a result of extensive investigations it has now been found that by the use of a halogenated aromatic compound containing active hydrogen in the reaction of a dihalogenated aromatic compound with an alkali metal sulfide in a polar solvent the above-described objects of the present invention can be attained with ease with only a small amount of the halogenated aromatic compound containing active hydrogen as compared with the conventional methods as described above.

That is, the present invention provides a method for producing a polyarylene sulfide comprising contacting a dihalogenated aromatic compound with an alkali metal sulfide in polar solvent, wherein said method is carried out in the presence of a halogenated aromatic compound containing active hydrogen.

DETAILED DESCRIPTION OF THE INVENTION

The polar solvent which can be used in the method of the present invention includes amide compounds, lactam compounds, urea compounds, cyclic organic phosphorus compounds, etc.

Specific examples of the polar solvent include N,N-dimethylformamide, N,N-dimethylacetamide, N,N-diethylacetamide, N,N-dipropylacetamide, N,N-dimethylbenzamide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-melthyl-2-pyrrolidone, N-methyl-3,4,5-trimethyl-2-pyrrolidone, N-ethyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxohexamethylenimine, N-ethyl-2-oxo-hexamethylenimine, tetramethylurea, 1,3-dimethylethyleneurea, 1,3-dimethylpropyleneurea, 1-methyl-1-oxosulforane, 1-ethyl-1-oxosulforane, 1-phenyl-1-oxosulforane, 1-methyl-1-oxophosphane, 1-propyl-1-oxophosphane, 1-phenyl-1-oxophosphane, etc.

Of the above-described polar solvents, N-alkyllactams, N-alkylpyrrolidones, etc. are preferred.

As the above-described dihalogenated aromatic compound, there can be enumerated dihalogenated benzenes such as m-dichlorobenzene, p-dichlorobenzene, p-dibromobenzene, m-bromobenzene, 1-chloro-4-bromobenzene, etc., substituted dihalogenated benzenes such as 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-toluyl-2,5-dichlorobenzene, 1-p-toluyl-2,5-dibromobenzene, 1-hexyl-2,5-dichlorobenzene, etc. Of these, dihalogenated benzenes are preferred, with p-dichlorobenzene being more preferred.

As the alkali metal sulfide, there can be enumerated, for example, lithium sulfide, sodium sulfide, potassium sulfide, rubidium sulfide, cesium sulfide, etc., and mixtures thereof. In the method of the present invention, the alkali metal sulfide can usually be used in the form of a hydrate or an aqueous mixture. Preferred example of the alkali metal sulfide include lithium sulfide and sodium sulfide.

The halogenated aromatic compound containing active hydrogen which can be used in the method of the present invention includes aromatic compounds having at least one aromatic ring in which at least one carbon atom of the aromatic ring is connected to a radical having an active hydrogen, and at least two carbon atoms of the aromatic ring are connected to halogen atoms.

Suitable examples of the above-described aromatic ring include a benzene ring, a naphthalene ring, an anthracene ring, etc. Of these, a benzene ring is preferred in the present invention.

When the above-described halogegated aromatic compound containing active hydrogen includes two or more aromatic rings the aromatic rings may be connected to each other either directly via a simple chemical bond or through intermediary of a divalent group. Suitable examples of the divalent group include an oxygen atom (—O—), a sulfur atom (—S—), a sulfinyl group, a sulfonyl group, a carbonyl group, and a divalent carbohydrate group such as an oxyalkylene group, a carbonylalkylene group, a polymethylene group, etc.

As for the radical containing active hydrogen, there can be mentioned of a monovalent group consisting of a nitrogen atom, a sulfur atom, an oxygen atom or a phosphorus atom and at least one hydrogen atom directly bonded thereto, or a monovalent carbohydrate group containing such hydrogen-containing monovalent group. Suitable examples thereof include —NH$_2$, —SH, —OH, —COOH, —CONH$_2$, —NHR, —CONHR, wherein R in the above-described two groups represents a carbohydrate group such as an alkyl group, a cycloalkyl group, an aryl group, an araryl group, an aryl group-substituted alkyl group, etc., or a carbohydrate group containing at least one of these groups. Of these, —NH$_2$, —SH, —OH, and —NHR wherein R has the same meaning as defined above are preferred, with —NH$_2$ being more preferred.

Suitable examples of the halogen atom include fluorine, chlorine, bromine, and iodine. Of these, chlorine and bromine are preferred, with chlorine being more preferred.

The two or more halogen atoms contained in two or more radicals containing active hydrogen or two or more halogenated aromatic compounds containing active hydrogen may be the same or different.

Of the halogenated aromatic compounds containing active hydrogen which meet the above-described conditions, dihalogenated aromatic compounds containing active hydrogen, and trihalogenated aromatic compounds containing active hydrogen are preferred, with dihalogenated aromatic compounds containing active hydrogen being more preferred.

Suitable examples of the above-described halogenated aromatic compound containing active hydrogen will be explained in greater detail with reference to general formula.

That is, the halogenated aromatic compounds containing active hydrogen which can be used advantageously in the present invention are represented by the following general formulae (I) to (III)

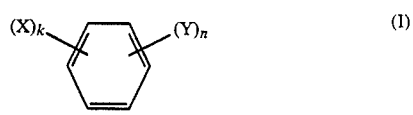

In the general formula (I) above, X represents a halogen atom such as fluorine, chlorine, bromine, iodine, etc., Y represents a group containing active hydrogen such as —NHR (that R has the same meaning as defined above), —NH$_2$, —SH, —OH, etc., k is an integer of 2 to 5, and n is an integer of 1 to 4, provided that k+n is an integer of 3 to 6. X represents preferably chlorine or bromine, and more preferably chlorine. Y represents preferably —NHR (that R has the same meaning as defined above), —NH$_2$, —SH, —OH, and more preferably —NH$_2$. k is preferably 2 or 3, and more preferably 2. n is 1 or 2, and more preferably 1.

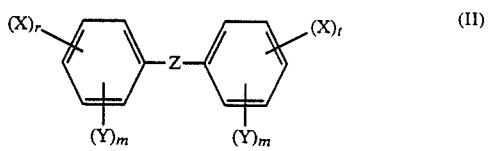

In the general formula (II) above, X and Y have the same meanings as defined above, Z represents a divalent group such as —O—, —S', —SO—, —SO$_2$—, —CO—, —(—CR$^1$R$^2$—)$_p$—, etc., or a simple chemical bond, p is 0 or an integer of 1 or more, r, t, n and m are 0 or an integer of 1 or more and simultaneously satisfy the following relationships:

| |
|---|
| 2 ≦ (r + t) ≦ {10 − (n + m)} |
| 1 ≦ (n + m) ≦ {10 − (r + t)} |
| (r + n) ≦ 5 |
| (t + m) ≦ 5 |

R$^1$ and R$^2$ independently represent a hydrogen atom or a carbohydrate group such as an alkyl group. Preferably, R$^1$ and R$^2$ independently represent a hydrogen atom or a methyl group, and more preferably a hydrogen atom. X represents preferably chlorine or bromine, with chlorine being more preferred. Y represents preferably —NHR (that R has the same meaning as defined above), —NH$_2$, —SH, or —OH, with —NH$_2$ being more preferred. Preferably, r and t are 0 or a positive integer and satisfy the relationship: (r+t)=2, or (r+t)=3, and more preferably (r+t)=2, that is, r=1 and t=1, r=2 and t=0, or r=0 and t=2. Preferably, n and m are such that (n+m)=1 or (n+m)=2, that is, $n=1$ and $m=0$, $n=0$ and $m=1$, $n=2$ and $m=0$, $n=1$, and $m=1$, or $n=0$ and $m=2$.

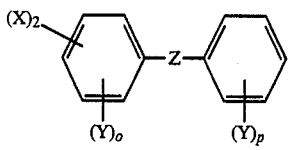

In the general formula (III) above, X, Y and Z have the same meanings as defined above, o is an integer of 1 to 3, and p is an integer of 1 to 5.

Suitable examples of the halogenated aromatic compound containing active hydrogen represented by general formula (I) include dihalogenated benzene compounds containing active hydrogen such as 2,6-dichloroaniline, 2,5-dichloroaniline, 2,4-dichloroaniline, 2,3-dichloroaniline, 2,4-dibromoaniline, 2,6-dichlorothiophenol, 2,5-dichlorothiophenol, 2,4-dichlorothiophenol, 2,3-dichlorothiophenol, 2,6-dichlorophenol, 2,5-dichlorophenol, 2,4-dichlorophenol, 2,3-dichlorophenol, 3,4-dichlorophenol, 3,5-dichlorophenol, 2,4-dibromophenol, 2,6-dibromophenol, (2,6-dichlorophenyl)aminobenzene, (2,5-dichlorphenyl)aminobenzene, (2,4-dichlorophenyl)aminobenzene, 2,3-(dichlorophenyl)aminobenzene, etc., trihalogenated benzene compounds containing active hydrogen such as 2,3,4-trichloroaniline, 2,3,5-trichloroaniline, 2,3.6-trichloroaniline, 2,4,5-trichloroaniline, 2,4,6-trichloroaniline, 3,4,5-trichloroaniline, 2,3,5-tribromoaniline, 2,4,5-tribromoaniline, 2,4,6-tribromoaniline, 2,5-dichloro-4-bromoaniline, 2,4,5-trichlorothiophenol, 2,3,5-trichlorothiophenol, 2,4,6-tribromothiophenol, 2,4,5-trichlorophenol, 2,3,5-trichlorophenol, 2,4,6-trichlorophenol, 2,4,6-tribromophenol, 2,3,5-trichloro(phenylamino)benzene, 2,4,5-trichloro(phenylamino)benzene, 2,4,6-trichloro(phenylamino)benzene, 2,4,5-tribromo(phenylamino)benzene, 2,4,6-tribromo(phenylamino)benzene, etc., polyhalogenated benzene compounds containing active hydrogen such as 2,3,4,5-tetrachloroaniline, 2,3,5,6-tetrachloroaniline, etc.

Suitable examples of the halogenated aromatic compound containing active hydrogen represented by general formula (II) include dihalogenated aromatic compounds containing active hydrogen, for example, diaminodichlorodiphenyl ethers such as 2,2'-diamino-4,4'-dichlorodiphenyl ether, 2,4'-diamino-2',4-dichlorodiphenyl ether, etc., diaminodichlorodiphenyl thioethers such as 2,2'-diamino-4,4'-dichlorodiphenyl thioether, 2,4'-diamino-2',4-dichlorodiphenyl thioether, etc., diaminodichlorodiphenyl sulfoxides such as 2,2'-diamino-4,4'-dichlorodiphenyl sulfoxide, 2,4'-diamino-2',4-dichlorodiphenyl sulfoxide, etc., diaminodichlorodiphenylalkanes such as 2,2'-diamino-4,4'-dichlorodiphenylmethane, 2,4'-diamino-2',4-dichloro-4,4'-dichlorodiphenylmethane, etc., dimercaptodichlorodiphenyl ethers such as 2,2'-dimercapto-4,4'-dichlorodiphenyl ether, 2,4'-dimercapto-2'4-dichlorodiphenyl ether, etc., dimercaptodichlorodiphenyl thioethers such as 2,2'-dimercapto-4,4'-dichlorodiphenyl thioether, 2,4'-dimercapto-2'4-dichlorodiphenyl thioether, etc., dimercaptodichlorodiphenyl sulfoxides such as 2,2'-dimercapto-4,4'-dichlorodiphenyl sulfoxide, 2,4'-dimercapto-2',4-dichlorodiphenyl sulfoxide, etc., dimercaptodichlorodiphenylalkanes such as 2,2'-dimercapto-4,4'-dichlorodiphenylmethane, 2,4'-dimercapto-2',4-dichlorodiphenylmethane, etc., dihydoxydichlorodiphenyl ethers such as 2,2'-dihydroxy-4,4'-dichlorodiphenyl ether, 2,4'-dihydroxy-2',4-dichlorodiphenyl ether, etc. dihydroxydichlorodiphenyl thioethers such as 2,2'-dihydroxy-4,4'-dichlorodiphenyl thioether, 2,4'-dihydroxy-2',4-dichlorodiphenyl thioether, etc., dihydroxydichlorodiphenyl sulfoxides such as 2,2'-dihydroxy-4,4'-dichlorodiphenyl sulfoxide, 2,4'-dihydroxy-2',4-dichlorodiphenyl sulfoxide, etc., dihydroxydichlorodiphenylalkanes such as 2,2'-dihydroxy-4,4'-dichlorodiphenylmethane, 2,4'-dihydroxy-2',4-dichlorophenylmethane, etc., dihalogenoaminodiphenyl ethers such as 2,5-dichloro-4'-aminodiphenyl ether, 2,5-dibromo-4'-aminodiphenyl ether, 2,5-dibromo-4'-aminodiphenyl ether, etc., dihalogenoaminodiphenyl thioethers such as 2,5-dichloro-4'-aminodiphenyl thioether, 2,5-dibromo-4'-aminodiphenyl thioether, etc., dihalogenoaminodiphenyl sulfoxides such as 2,5-dichloro-4'-aminodiphenyl sulfoxide, 2,5-dibromo-4'-aminodiphenyl sulfoxide, etc., dihalogenoaminodiphenylalkanes such as 2,5-dichloro-4'-aminodiphenylmethane, 2,5-dibromo-4'-aminodiphenylmethane, etc., dihalogenomercaptodiphenyl ethers such as 2,5-dichloro-4'-mercaptodiphenyl ether, 2,5-dibromo-4'-mercaptodiphenyl ether, etc., dihalogenomercaptodiphenyl thioethers such as 2,5-dichloro-4'-mercaptodiphenyl thioether, 2,5-dibromo-4'-mercaptodiphenyl thioether, etc., dihalogenomercaptodiphenyl sulfoxides such as 2,5-dichloro-4'-mercaptodiphenyl sulfoxide, 2,5-dibromo-4'-mercaptodiphenyl sulfoxide, etc., dihalogenomercaptodiphenylalkanes such as 2,5-dichloro-4'-mercaptodiphenylmethane, 2,5-dibromo-4'-mercaptodiphenylmethane, etc., dihalogenohydroxydiphenyl ethers such as 2,5-dichloro-4'-hydroxydiphenyl ether, 2,5-dibromo-4'-hydroxydiphenyl ether, etc., dihalogenohydroxydiphenyl thioethers such as 2,5-dichloro-4'-hydroxydiphenyl thioether, 2,5-dibromo-4'-hydroxydiphenyl thioether, etc., dihalogenohydroxydiphenyl sulfoxides such as 2,5-dichloro-4'-hydroxydiphenyl sulfoxide, 2,5-dibromo-4'-hydroxydiphenyl sulfoxide, etc., dihalogenohydroxydiphenylalkanes such as 2,5-dichloro-4'-hydroxydiphenylmethane, 2,5-di-bromo-4'-hydroxydiphenylmethane, etc., trihalogenated compounds containing active hydrogen, for example, aminotrihalogenodiphenyl ethers such as 2,2'-diamino-3,4,4'-trichlorodiphenyl ether, 2,4'-diamino-2',5',4-trichlorodiphenyl ether, 2,4,5-tri-chloro-4'-aminodiphenyl ether, 2,3,4-trichloro-4'-aminodiphenyl ether, 2,4,5-tribromo-4'-aminodiphenyl ether, 2,4,6-tribromo-4'-aminodiphenyl ether, 2,5-dichloro-6-bromo-4'-aminodiphenyl ether, 2,4,5-trichloro-2'-aminodiphenyl ether, etc., aminotrihalogenodiphenyl thioethers such as 2,2'-diamino-3,4,4'-tri-chlorodiphenyl thioether, 2,4,5-trichloro-4'-aminodiphenyl thioether, etc., aminotrichlorodiphenyl sulfoxides such as 2,2'-diamino-4,5,4'-trichlorodiphenyl sulfoxide, 2,4,5-trichloro-4'-aminodiphenyl sulfoxide, etc., aminotrihalogenodiphenylalkanes such as 2,2'-diamino-3,4,4'-trichlorodiphenylmethane, 2,4,5-tri-chloro-4'-aminodiphenylmethane, 2,4,4'-trichloro-2'-aminodiphenylpropane, etc., aminotrihalogenobiphenyls such as 3,4,4'-trichloro-3'-aminobiphenyl, etc., mercaptotrihalogenodiphenyl ethers such as 2,2'-dimercapto-3,4,4'-trichlorodiphenyl ether, 2,4,5-trichloro-4'-mercaptodiphenyl ether, etc., mercaptotrihalogenodiphenyl thioethers such as 2,2'-dimercapto-4,5,4'-trichlorodiphenyl thioether, 2,4,5-tri-chloro-4'-mercaptodiphenyl thioether, etc., mercaptotrihalogenodiphenyl sulfoxides such as 2,2'-dimercapto-3,5,4'-trichlorodiphenyl sulfoxide, 2,4,5-tri-chloro-4'-mercaptodiphenyl sulfoxide, etc., mercaptotrihalogenobiphenyls such as 3,3'-dimercapto-4,4',5-trichlorodiphenylmethane, 2,4,5-trichloro-4'-mercaptodiphbenylmethane, etc., hydroxytrihalogenobiphenyls such as 3,3'-dimercapto-4,4',5-trichlorobiphenyl, 3,4,5-trihloro-4'-mercaptobiphenyl, etc., hydroxytrihalogenodiphenyl ethers such as 2,2'dihydroxy-3,4,4'-trichlorodiphenyl ether, 2,4,5-trichloro-4'-hydroxydiphenyl ether, etc., hydroxytrihalogenodiphenyl thioethers such as 2,2'-dihydroxy-3,4,4'-trichlorodiphenyl thioether, 2,4,5-trichloro-4'-hydroxydiphenyl thioether, etc., hydroxytrihalogenodiphenyl sulfoxides such as 2,2'-dihydroxy-4,4',5-trichlorodiphenyl sulfoxide, 2,4,5-tri-chloro-4'-hydroxydiphenyl sulfoxide, etc., hydroxytrihalogenodiphenylalkanes such as 2,2'-dihydroxy-4,4',5-trichlorodiphenylmethane, 2,4,6-trichloro-4'-hydroxydiphenylmethane, etc., hydroxytrihalogenobiphenyls such as 3-hydroxy-3',4',4-trichlorobiphenyl, 3,4,5-trichloro-4'-hydroxybiphenyl, etc., polyhalogenated aromatic compounds containing active hydrogen such as tetrachloroaminodiphenyl ether, tetrachloroaminodiphenyl thioether, etc.

Suitable examples of the dihalogenated compound containing active hydrogen represented by general formula (III) include dihalogenoaminodiphenyl ethers such as 2,5-dichloro-4'-aminodiphenyl ether, 2,5-dibromo-4'-aminodiphenyl ether, etc., dihalogenoaminodiphenyl thioethers such as 2,5-dichloro-4'-aminodiphenyl thioether, 2,5-dibromo-4'-aminodiphenyl thioether, etc., dihalogenoaminodiphenyl sulfoxides such as 2,5-dichloro-4'-aminodiphenyl sulfoxide, 2,5-dibromo-4'-aminodiphenyl sulfoxide, etc., dihalogenoaminodiphenylmethanes such as 2,5-dichdloro-4'-aminodiphenylmethane, 2,5-dibromo-4'-aminodiphenylmehtane, etc., dihalogenomercaptodiphenyl ethers such as 2,5-dichloro-4'-mercaptodiphenyl ether, 2,5-dibromo-4'-mercaptodiphenyl ether, etc., dihalogenomercaptodiphenyl thioethers such as 2,5-dichloro-4'-mercaptodiphenyl thioether, 2,5-dibromo-4'-mercaptodiphenyl thioether, etc., dihalogenomercaptodiphenyl sulfoxides such as 2,5-dichloro-4'-mercaptodiphenyl sulfoxide, 2,5-dibromo-4'-mercaptodiphenyl sulfoxide, etc., dihalogenomercaptodiphenylalkanes such as 2,5-dichloro-4'-mercaptodiphenylmethane, 2,5-dibromo-4'-mercaptodiphenylmethane, etc., dihalogenohydroxydiphenyl ethers such as 2,5-dichloro-4'-hydroxydiphenyl ether, 2,5-dibromo-4'-hydroxydiphenyl ether, etc., dihalogenohydroxydiphenyl thioethers such as 2,5-dichloro-4'-hydroxydiphenyl thioether, 2,5-dibromo-4'-hydroxydiphenyl thioether, etc., dihalogenohydroxydiphenyl sulfoxides such as 2,5-dichloro-4'-hydroxydiphenyl sulfoxide, 2,5-dibromo-4'-hydroxydiphenyl sulfoxide, etc., dihalogenohydroxydiphenylalkanes such as 2,5-dichloro-4'-hydroxydiphenylmethane, 2,5-dibromo-4'-hydroxydiphenylmethane, etc.

In the present invention, those compounds comprising a naphthalene nucleus substituted with an active hydrogen-containing radical such as an amino group, a mercapto group, or a hydroxy group, and a halogen atom can also be used in addition to the above-described halogen aromatic compounds containing active hydrogen represented by one of general formulae (I), (II) and (III).

Of the halogenated aromatic compounds containing active hydrogen, those represented by general formula (I) are preferred. Further, dihalogenated aromatic compounds containing active hydrogen are suitable and among them dichloroaniline is particularly preferred.

In the present invention, the above-described various halogenated aromatic compounds containing active hydrogen can be used singly or in combination.

According to the present invention, polyarylene sulfides can be produced by reacting (A) the dihalogenated aromatic compound with (B) the alkali metal sulfide in the presence of (C) the halogenated aromatic compound containing active hydrogen in (D) the polar solvent.

Of the halogenated aromatic compounds containing active hydrogen represented by general formula (I), (II) or (III), those in which Y represents an amino group can also be produced by reducing the nitro group of a halogenated aromatic nitro compound represented by general formula (IV), (V) or (VI) in the reaction system.

Therefore, the method of the present invention can also be carried out by reacting the dihalogenated aromatic compound (A) with the alkali metal sulfide (B) in the presence of a halogenated aromatic nitro compound (E) represented by general formula (IV), (V) or (VI), with optionally adding a reducing agent (F), instead of directly using the halogenated aromatic compound containing active hydrogen (C).

That is, the halogenated aromatic nitro compound (E) represented by general formula (IV), (V) or (VI) and the alkali metal sulfide (B) or the reducing agent (F) are reacted to form in the reaction system the halogenated aromatic compound containing active hydrogen (C), which makes it possible to produce polyarylene sulfide by substantially reacting the dihalogenated aromatic compound (A) with the alkali metal sulfide (B) in the presence of the halogenated aromatic compound containing active hydrogen in the polar solvent (D).

The halogenated aromatic compounds (E) are represented by general formula (IV), (V) or (VI) below.

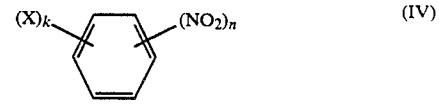
(IV)

In general formula (IV), X and k have the same meanings as defined in general formula (I).

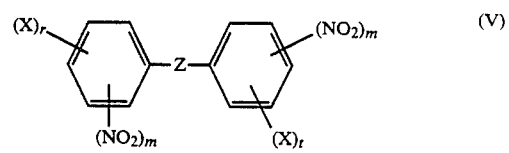
(V)

In general formula (V), Z, m, r and t have the same meanings as defined above.

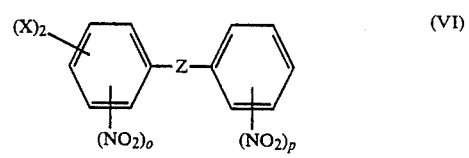
(VI)

In general formula (VI), X, Z, o and p have the same meanings as defined above.

Specific examples of the compound represented by general formula (IV) include 2,4-dinitrochlorobenzene, 2,5-dinitrochlorobenzene, etc.

Specific examples of the compound represented by general formula (V) include 2-nitro-4,4'-dichlorodiphenyl ether, 3,3'-dinitro-4,4'-dichlorodiphenylsulfone, etc.

Specific examples of the compound represented by general formula (VI) include 2,5-dichloro-4'-nitrodiphenyl ether, 2,5-dichloro-4'-nitrodiphenyl thioether, etc.

As for the reducing agent (F), there can be mentioned of, for example, hydrazine, hydrides, alkali formate, etc. Preferred examples thereof include hydrides such as calcium hydride ($CaH_7$), hydrogen sulfide, etc., borohydrides such as lithium borohydride, sodium borohydride ($NaBH_4$), potassium borohydride, etc. Borohydrides are particularly preferred.

When the halogenated aromatic compound containing active hydrogen (C) are used, usually the components (A), (B), (C) and (D) can be used in the polycondensation reaction in the following proportions.

That is, the molar ratio of the component (A)/component (B) is from 0.75 to 2.0, preferably from 0.90 to 1.2. Since the reaction between the dihalogenated aromatic compound (A) and the alkali metal sulfide (B) is an equimolar reaction usually the above-described range is selected.

The component (C) is used in an amount of from 0.005 to 2.0 mol%, preferably from 0.01 to 1.5 mol%, based on the component (A). When the amount of the component (C) is less than 0.005 mol%, it is sometimes difficult to produce polyarylene sulfides having a high molecular weight. On the other hand, when the amount of the component (C) is more than 2 mol%, gelation occurs under certain circumstances.

The molar ratio of the component (D)/component (B) is from 1 to 15, preferably 2 to 10. When this value is less than 1, the reaction is sometimes non-uniform, while the productivity is decreased when the molar ratio is more than 15.

The polycondensation reaction used for the production of polyvarylene sulfide is carried out usually under alkaline atmosphere.

Therefore, in order to render the reaction system alkaline, an alkali hydroxide (G) can be added to the reaction system.

Suitable examples of the alkali hydroxide (G) include sodium hydroxide, lithium hydroxide, potassium hydroxide, rubidium hydroxide, cesium hydroxide, etc. Of these, lithium hydroxide, sodium hydroxide, potassium hydroxide, etc. are preferred.

The amount of the alkali hydroxide added to the reaction system is not particularly limited as far as it is sufficient for rendering the reaction system alkaline.

Upon the production of polyarylene sulfides, it is preferred that a catalyst is present in the reaction system since the polycondensation reaction between the dihalogenated aromatic compound and the alkali metal sulfide can proceed smoothly.

Suitable examples of the catalyst include alkali metal halide compounds (H), metal carboxylates (I), aromatic sulfonates (J), etc.

Suitable examples of alkali metal halide compounds include lithium fluoride, lithium chloride, lithium bromide, lithium iodide, sodium fluoride, calcium fluoride, rubidium fluoride, cesium fluoride, and mixtures thereof. The alkali metal halide compounds may be used as anhydrides, or hydrates or aqueous mixtures. Of these, lithium chloride is preferred.

Suitable examples of the metal carboxylate (I) include lithium acetate, lithium propionate, lithium 2-methylpropionate, lithium butyrate, lithium 3-methylbutyrate, lithium hexanoate, lithium valerate, lithium heptanoate, lithium benzoate, sodium benzoate, zinc acetate, calcium phosphate, etc. Of these, lithium carboxylate is preferred, with lithium acetate being particularly preferred. The metal carboxylate may be used in the form of hydrates.

As for the aromatic sulfonate (J), there can be cited, for example, sodium p-toluenesulfonate, etc.

Among the alkali metal halide compounds (H), carboxylates (I) and sulfonates (J), the alkali metal halide compounds (H) are preferred as a catalyst since the alkali metal halide compound (H) present in the reaction system, in cooperation with the concomitant halogenated aromatic compound containing active hydrogen, is useful in reducing the amount of contaminant salt(s) in the resultant polyarylene sulfide considerably although the underlying mechanism has not been clarified yet.

Of course, use of the alkali metal halide compound (H) as a catalyst does not preclude use of other catalyst(s) such as the carboxylate (I) and/or sulfonate (J) simultaneously, and a combination of the alkali metal halide compound (H) and the carboxylate (I) and/or sulfonate (J) can also be used as a catalyst.

The molar ratio of the carboxylate or aromatic sulfonate to be added to the component (B) is the same as the molar ratio of the component (D)/component (B).

In the method of the present invention, upon condensation reaction, these components can be brought in contact all at the same time or they can be contacted separately. There is no particular limitation on the order of the addition of the components.

The condensation reaction is carried out usually at a temperature in the range of from 180° to 320° C., preferably from 220° to 300° C. When the reaction temperature is above 320° C. side reaction occurs during the condensation reaction, or productivity of polyarylene sulfide may sometimes be decreased. The preferred temperature is not higher than 320° C. or less, and more specifically, a temperature higher than the melting point of polyarylene sulfide, preferably by 5° C. higher than the melting point of polyarylene sulfide which is produced.

For example, the melting point of typical polyarylene sulfide is in the vicinity of 284° C. and hence the temperature of the condensation reaction is set at from 284° to 296° C., preferably at from 289° to 292° C.

There is no particular limitation on the reaction pressure used in the condensation reaction but usually the pressure which can used varies from the self inside pressure of the reactor to 50 kg/cm² (absolute pressure), preferably from the self inside pressure of the reactor to 10 kg/cm² (absolute pressure).

The condensation reaction may be carried out under an atmosphere of an inert gas such as nitrogen, carbon dioxide, steam, etc.

The reaction time is usually in the range of from 0.1 to 8 hours.

After completion of the reaction, polyarylene sulfide can be separated from the reaction mixture directly or after addition of a dilute acid using a conventional method such as filtration or centrifugation.

Subsequent to filtration, generally, the residue is washed with water in order to remove any inorganic components such as alkali metal sulfide and alkali hydroxide that could adhere to the resultant polymer. In addition to or after the washing step, washing using different washing solution or extraction can be carried out. The polymer obtained can be recovered by removing the solvent from the reactor and then washing the polymer in the manner described above.

The polyarylene sulfide thus recovered has a sufficiently high molecular weight without needing heat treatment. Particularly, it should be noted those polyarylene sulfides which are prepared according to the method using an alkali metal halide as a catalyst, and those which are obtained by performing polycondensation at a temperature higher than the melting point of the polyarylene sulfide contain salts such as sodium chloride, etc. in amounts much smaller than those contained in polyarylene sulfides prepared according to conventional methods. As a result, the polyarylene sulfide according to the present invention can be molded and processed without needing desalting beforehand, and utilized in electric and electronic fields advantageously. However, if desired, various desalting treatments can be carried out in addition to the above-described washing step or after the washing step to further decrease the content of salts such as sodium chloride in the resin prior to use.

When the polyarylene sulfide obtained according to the method of the present invention is molded into various articles, it can be admixed with other polymers, pigments, fillers such as graphite, metal powders, glass powders, quartz powders or glass fiber, or additives usually used for polyarylene sulfides such as conventional stabilizers or mold lubricants.

The polyarylene sulfide obtained according to the method of the present invention contains only a small amount of salts in the polymer and therefore it has a high insulational resistance to humidity and a low melt flow index which indicates that the polymer has a high molecular weight, resulting in that it can be used not only as a matrix resin for producing various molded articles and composite materials but also molded into various articles, films, fibers, etc. Therefore, it is excellent engineering plastic which can be used advantageously for producing various mechanical or electronic parts.

The present invention has the following benefits or advantages;

(1) High molecular weight polyarylene sulfides having a low melt flow index can be produced.

(2) According to the method of the present invention, polyarylene sulfide having a high molecular weight can be produced using trichlorobenzene in an amount half that used in the conventional method by the addition of the halogenated aromatic compound containing active hydrogen.

(3) In the method of the present invention, polyarylene sulfide containing less contaminant salt content can be obtained by the use of the specified catalyst.

(4) In the method of the present invention, polyarylene sulfide containing less contaminant salt content can also be obtained by fixing the temperature of the condensation reaction to the specified level.

The present invention will be described in greater detail with reference to examples and comparative examples. However, the present invention should not be construed as being limited to these examples.

EXAMPLE 1

In a 2 l autoclave were charged 81.5 g (0.56 mol) of p-dichlorobenzene, 25.0 g (0.54 mol) of lithium sulfide, 0.164 g (0.001 mol) of 2,5-dichloroaniline, 0.914 g (0.024 mol) of sodium borohydride, and 306 ml (2.93 mol) of N-methyl-2-pyrrolidone as solvent, and nitrogen gas was passed at room temperature for 10 minutes to purge the air in the autoclave. Then, while stirring the mixture the temperature of the reaction system was elevated up to 120° C., followed by sealing the autoclave, elevating the temperature up to 265° C. and allowing the mixture to react for 3 hours. After completion of the reaction, the reaction mixture was cooled to 190° C. with stirring, and then left to stand until the temperature reached room temperature. The reaction mixture was poured into 1 l of water, filtered, washed with water and washed with methanol in this order.

The polyphenylene sulfide obtained had a melt flow index of 0.034 ml/sec. The melt flow index was measured under the conditions of 300° C., a load of 50 kg/cm$^2$, and the diameter and length of nozzle used: 1 mm and 10 mm, respectively.

EXAMPLE 2

The same procedures as in Example 1 were repeated except that the amount of 2,5-dichloroaniline was changed to 0.772 g (0.0048 mol).

The polyphenylene sulfide had a melt flow index of 0.01 ml/sec.

COMPARATIVE EXAMPLE 1

The same procedures as in Example 1 were repeated except that 2,5-dichloroaniline was not used.

The polyphenylene sulfide obtained had a melt flow index of 0.79 ml/sec.

COMPARATIVE EXAMPLE 2

The same procedures as in Example 1 was repeated except that 0.001 mol of trichlorobenzene was used in place of 0.001 mol of 2,5-dichloroaniline.

The polyphenylene sulfide obtained had a melt flow index of 0.49 ml/sec.

EXAMPLE 3

The same procedures as in Example 1 were repeated except that sodium borohydride was not used.

The polyphenylene sulfide obtained had a melt flow index of 0.026 ml/sec.

EXAMPLE 4

In a 2 l autoclave were charged 130.4 g (0.54 mol) of sodium sulfide nonahydrate, 35.8 g (0.54 mol) of lithium acetate, 40.1 g (0.54 mol) of lithium carbonate and 370 ml of N-methyl-2-pyrrolidone, and 88 ml of water was removed by azeotropic distillation. Thereafter, 81.5 g (0.56 mol) of p-dichlorobenzene, 25.0 g (0.54 mol) of lithium sulfide, 0.161 g (0.001 mol) of 2,5-dichloroaniline and 150 ml of N-methyl-2-pyrrolidone were added to the reaction system, and under nitrogen gas atmosphere the reaction was carried out at a temperature of 265° C. for 3 hours. The reaction mixture was poured into 0.1N hydrochloric acid, filtered, washed with water and washed with methanol in this order.

The polyphenylene sulfide obtained has a melt flow index of 0.40 ml/sec.

EXAMPLE 5

The same procedures as in Example 4 were repeated except that the amount of 2,5-dichloroaniline was changed to 0.733 g (0.0045 mol).

The polyphenylene sulfide had a melt flow index of 0.06 ml/sec.

COMPARATIVE EXAMPLE 3

The same procedures as in Example 3 were repeated except that 0.001 mol of trichlorobenzene was used in place of 0.001 mol of 2,5-dichloroaniline.

The polyphenylene sulfide obtained had a melt flow index of 0.65 ml/sec.

EXAMPLE 6

In a 1 l autoclave were charged 45.0 g (0.31 mol) of p-dichlorobenzene, 13.8 g (0.30 mol) of lithium sulfide, and 0.168 g (0.004 mol) of lithium hydroxide monohydrate, and then 0.20 g (0.001 mol) of 2,5-dichloronitobenzene, 0.5 g (0.013 mol) of sodium borohydride, and 169 ml (1.62 mol) of N-methyl-2-pyrrolidone as solvent, and argon gas was passed at room temperature for 10 minutes to purge the air in the autoclave. Then, while stirring the mixture the temperature of the reaction system was elevated up to 110° C., followed by sealing the autoclave, elevating the temperature up to 265° C. and allowing the mixture to react for 3 hours. After completion of the reaction, the reaction mixture was cooled to 215° C. with stirring, and then left to stand until the temperature reached room temperature. The reactin mixture was poured into 1 l of water, filtered, washed with water and washed with hot methanol in this order.

The polyphenylene sulfide obtained had a melt flow index shown in Table 1 below.

COMPARATIVE EXAMPLE 4

The same procedures as in Example 6 were repeated except that 2,5-dichloroaniline was not used.

The polyphenylene sulfide obtained had a melt flow index of 0.78 ml/sec. This was heated at 200° C. for 1 hour. The physical properties of the thus treated polymer are as shown in Table 1 below.

EXAMPLE 7

The same procedures as in Example 6 were repeated except that sodium borohydride was not used.

The polyphenylene sulfide obtained had a melt flow index as shown in Table 1 below.

TABLE 1

| | Melt Flow Index* (ml/sec) | Melting Point (°C.) | Heat Decomposition Temperature** | |
|---|---|---|---|---|
| | | | 5 wt % Reduction (°C.) | 10 wt % Reduction (°C.) |
| Ex. 6 | 0.15 | 273 | 484 | 502 |
| C. Ex. 4 | 0.19 | 273 | 486 | 500 |
| Ex. 7 | 0.20 | 276 | 485 | 501 |

*Under the conditions of 300° C., a load of 50 kg/cm$^2$, the diameter and length of nozzle used: 1 mm and 10 mm, respectively.
**Measured by TGA.

From the results shown in Table 1 above, it can be seen that in Comparative Example 4 polyphenylene sulfide having physical properties similar to those of polyphenylene sulfides of Examples 6 and 7 could not be obtained before the polyphenylene sulfide was heated at 200° C.

EXAMPLE 8

The same procedures as in Example 6 were repeated except that the amount of 2,5-dichloronitrobenzene was changed to 0.48 g (0.0025 mol), and 0.004 mol of potassium hydroxide was used in place of lithium hydroxide monohydrate.

The polyphenylene sulfide obtained had a melt flow index of 0.01 ml/sec.

EXAMPLE 9

The same procedures as in Example 6 were repeated except that 0.211 g (0.001 mol) of 2,4-dinitrochlorobenzene was used in place of 2,5-dichloronitrobenzene.

The polyphenylene sulfide obtained had a melt flow index of 0.48 ml/sec.

COMPARATIVE EXAMPLE 5

The same procedures as in Example 6 were repeated except that 2,5-dichloroaniline was not used and in place of sodium borohydride were used 19.8 g (0.3 mol) of lithium acetate and 22.2 g (0.3 mol) of lithium carbonate.

The polyphenylene sulfide obtained had a melt flow index of 0.58 ml/sec.

EXAMPLE 10

The same procedures as in Example 6 were repeated except that 0.57 g (0.002 mol) of 2-nitro-4,4'-dichlorodiphenyl ether was used in place of 2,5-dichloronitrobenzene.

The polyphenylene sulfide obtained had a melt flow index of 0.08 ml/sec.

EXAMPLE 11

In a 2 l autoclave were charged 130.4 g (0.54 mol) of sodium sulfide nonahydrate and 368 ml of N-methyl-2-pyrrolidone, and 88 ml of water was removed by azeotropic distillation. Thereafter, 81.5 g (0.56 mol) of p-dichlorobenzene, 0.91 g (0.024 mol) of sodium borohydride, 0.483 g (0.0029 mol) of p-dichloroaniline and 212 ml of N-methyl-2-pyrrolidone were added to the reaction system, and under nitrogen gas atmosphere the reaction was carried out at a temperature of 285° C. for 3 hours. The reaction mixture was poured into 1 l of ion-exchanged water, filtered, washed with water and washed with methanol in this order.

The polyphenylene sulfide obtained had a melt flow index of 0.77 ml/sec and an inherent viscosity η inh (in 1-chloronaphthalene, 206° C.) of 0.13. The Na$^+$ content of the polymer was 630 ppm according to atomic absorption spectroscopy.

EXAMPLE 12

The same procedures as in Example 11 were repeated except that the reaction temperature was changed to 290° C.

The polymer obtained had a melt flow index of 0.80 ml/sec and an inherent viscosity η inh (in 1-chloronaphthalene, 206° C.) of 0.12. The Na$^+$ content of the polymer was 450 ppm.

EXAMPLE 13

The same procedures as in Example 11 were repeated except that sodium borohydride was not used.

The polymer obtained had a melt flow index of 0.78 ml/sec and an inherent viscosity η inh (in 1-chloronaphthalene, 206° C.) of 0.12. The Na+ content of the polymer was 480 ppm.

EXAMPLE 14

The same procedures as in Example 11 were repeated except that sodium borohydride and 2,5-dichloroaniline were not used.

The polymer obtained had a melt flow index of 0.90 ml/sec or more and an inherent viscosity η inh (in 1-chloronaphthalene, 206° C.) of 0.09. The Na+ content of the polymer was 250 ppm.

COMPARATIVE EXAMPLE 6

The same procedures as in Example 11 were repeated except that the reaction temperature was changed to 263° C.

The polymer obtained had a melt flow index of 0.79 ml/sec and an inherent viscosity η inh (in 1-chloronaphthalene, 206° C.) of 0.13. The Na+ content of the polymer was 2400 ppm.

COMPARATIVE EXAMPLE 7

In Example 14, the reaction was carried out at 200° C. Thereafter, the same post treatment was carried out.

The polymer obtained had a melt flow index of 0.90 ml/sec or more, an inherent viscosity η inh (in 1-chloronaphthalene, 206° C.) of 0.09. The Na+ content of the polymer was 2500 ppm.

This sample was boiled in boiling ion-exchanged water for 2 hours, filtered and washed with methanol. The Na+ content of the polymer was 1600 ppm.

COMPARATIVE EXAMPLE 8

In a 1 l autoclave were charged 13.8 g (0.30 mol) of lithium sulfide, 45.0 g (0.31 mol) of p-dichlorobenzene and 19.8 g (0.30 mol) of lithium acetate, 22.2 g (0.30 mol) of lithium carbonate and 168 ml of N-methyl-2-pyrrolidone and the reaction was continued under nitrogen gas atmosphere at a temperature of 262° to 265° C. for 3 hours. The reaction product was post-treated in the same manner as in Example 11.

The Li+ content in the polymer obtained was 930 ppm according to the atomic absorption spectroscopy. The polymer had a melt flow index of 0.76 ml and an inherent viscosity of 0.14.

EXAMPLE 15

In a 2 l autoclave were charged 130.4 g (0.54 mol) of sodium sulfate nonahydrate, 23.0 g (0.54 mol) of lithium chloride and 356 ml of N-methyl-2-pyrrolidone, and 88 ml of water was removed by azeotropic distillation. Thereafter, 81.5 g (0.56 mol) of p-dichlorobenzene, 0.80 g (0.005 mol) of 2,5-dichloroaniline and 150 ml of N-methyl-2-pyrrolidone were added to the reaction system, and under nitrogen gas atmosphere the reaction was carried out at a temperature of 287° C. for 3 hours. Ion-exchanged water (1 l) was poured to the reaction mixture, filtered, washed with ion-exchanged water and washed with methanol in this order.

The polyphenylene sulfide obtained had a melt flow index of 0.0031 ml/sec. The solution thereof had an inherent viscosity η inh (in 1-chloro-naphthalene, 206° C.) of 0.30. The content of residual ion in the polymer was 60 ppm for Na+ and 120 ppm for Li+.

EXAMPLE 16

The same procedures as in Example 15 were repeated except that 15.3 g (0.36 mol) of lithium chloride was used and the reaction temperature was 265° C.

The polyphenylene sulfide obtained had a melt flow index of 0.007 ml/sec. The solution thereof had an inherent viscosity η inh (in 1-chloronaphthalene, 206° C.) of 0.35. The content of residual ion in the polymer was 40 ppm for Na+ and 70 ppm for Li+.

EXAMPLE 17

The procedures as in Example 16 were repeated using the same reaction system as in Example 15 except that 0.30 g (0.008 mol) of sodium hydride was added, 0.80 g (0.005 mol) of 2,5-dichloroaniline was used and the reaction temperature was 285° C.

The polyphenylene sulfide obtained had a melt flow index of 0.028 ml/sec. The solution thereof had an inherent viscosity η inh (in 1-chloronaphthalene, 206° C.) of 0.31. The content of residual ion in the polymer was 60 ppm for Na+ and 270 ppm for Li+.

COMPARATIVE EXAMPLE 9

The same procedures as in Example 15 were repeated except that 0.89 g (0.005 mol) of trichlorobenzene was used in place of 2,5-dichloroaniline. The polymer formed gelled and became insoluble in the autoclave. The content of residual ion in the polymer was 2200 ppm for Na+ and 1,000 ppm for Li+.

COMPARATIVE EXAMPLE 10

The same procedures as in Example 15 were repeated except that lithium chloride was not used.

The polyphenylene sulfide obtained had a melt flow index of 0.78 ml/sec. The solution thereof had an inherent viscosity η inh (in 1-chloronaphthalene, 206° C.) of 0.13. The content of residual ion in the polymer was 640 ppm for Na+.

COMPARATIVE EXAMPLE 11

The same procedures as in Example 15 were repeated except that 2,5-dichloroaniline was not used.

The polyphenylene sulfide obtained had a melt flow index of 0.15 ml/sec. The solution thereof had an inherent viscosity η inh (in 1-chloro-naphthalene, 206° C.) of 0.23. The content of residual ion in the polymer was 70 ppm for Na+ and 200 ppm for Li+.

While the invention has been described in detail and with reference to specific embodiments thereof, it will be apparent to one skilled in the art that various changes and modifications can be made therein without departing from the spirit and scope thereof.

What is claimed is:

1. A polycondensation method for producing a polyarylene sulfide having a high molecular weight and low flowability comprising contacting a dihalogenated aromatic compound with an alkali metal sulfide in a polar solvent containing reaction system, wherein a polyhalogenated aromatic compound containing active hydrogen and a lithium halide as a catalyst are present in the reaction system.

2. A polycondensation method for producing a polyarylene sulfide having a high molecular weight and low flowability comprising contacting a dihalogenated aromatic compound with an alkali metal sulfide in a polar solvent containing reaction system, wherein a polyhalogenated aromatic compound containing active hydrogen and a lithium halide as a catalyst are present in the reaction system, wherein said poly-halogenated aromatic compound containing active hydrogen is formed in the reaction system by the reduction of a halogenated aromatic nitro compound added to the reaction system.

3. A method according to claim 1 wherein said poly-halogenated aromatic compound containing active hydrogen is an aromatic compound having at least one aromatic ring in which at least one carbon atom of the aromatic ring is connected to a radical having an active hydrogen, and at least two carbon atoms of the aromatic ring are connected to halogen atoms.

4. The method as claimed in claim 1, wherein said lithium halide is lithium chloride.

5. The method as claimed in claim 1, wherein the reaction for the production of the polyarylene sulfide is carried out at a temperature not lower than the melting point of the polyarylene sulfide.

6. The method as claimed in claim 1, wherein said dihalogenated aromatic compound is p-dichlorobenzene.

7. The method as claimed in claim 1, wherein said halogenated aromatic compound containing active hydrogen is a dihalogenated aromatic compound containing active hydrogen.

8. The method as claimed in claim 2, wherein said halogenated aromatic compound containing active hydrogen is a dihalogenated aromatic compound containing active hydrogen.

9. The method as claimed in claim 7, wherein said dihalogenated aromatic compound containing active hydrogen is dichloroaniline.

10. The method as claimed in claim 8, wherein said dihalogenated aromatic compound containing active hydrogen is dichloroaniline.

11. A method according to claim 1 wherein said method is effected to provide said polyarylene sulfide having a melt flow index of up to 0.90 ml/sec.

12. A method according to claim 1 wherein said poly-halogenated aromatic compound containing active hydrogen is present in an amount of 0.005–2.0 mol percent based on said dihalogenated aromatic compound.

* * * * *

UNITED STATES PATENT AND TRADEMARK OFFICE
CERTIFICATE OF CORRECTION

PATENT NO. : 4,810,773
DATED : March 7, 1989
INVENTOR(S) : OGATA et al.

It is certified that error appears in the above-identified patent and that said Letters Patent is hereby corrected as shown below:

| | |
|---|---|
| Column 1, line 38 | Delete "since", insert therefor -- because -- |
| Column 1, line 39 | Delete "such", after "a" insert -- sufficiently -- |
| Column 1, line 39 | Delete "that no", insert therefor -- without -- |
| Column 1, line 40 | Delete "is needed" |
| Column 1, line 41 | Delete "has", insert therefor -- have -- |
| Column 1, line 50 | Delete "on", insert therefor -- in -- |
| Column 1, line 62 | Delete "for", insert therefor -- in the Manufacture of -- |
| Column 1, line 64 | Delete "in the occurrence of" |
| Column 2, line 8 | Before "polyarylene", insert -- resultant -- |
| Column 2, line 16 | Delete "cause gelation", insert therefor -- gel -- |
| Column 2, line 26 | After "solvent", insert a -- , -- |
| Column 3, line 46 | Delete the first use of "of" |
| Column 4, lone 26 | Delete "that", insert therefor -- where -- |
| Column 4, line 31 | Delete "that", insert therefor -- where -- |
| Column 4, line 44 | Delete "-S'", insert therefor -- -S- -- |
| Column 4, line 62 | Delete "that", insert therefor -- where -- |

UNITED STATES PATENT AND TRADEMARK OFFICE
CERTIFICATE OF CORRECTION

PATENT NO. : 4,810,773

DATED : March 7, 1989

INVENTOR(S) : OGATA et al.

Page 2 of 2

It is certified that error appears in the above-identified patent and that said Letters Patent is hereby corrected as shown below:

CON'T

| | |
|---|---|
| Column 5, line 24 | Delete "dibromopnenol", insert therefor -- dibromophenol -- |
| Column 5, line 24 | Delete "2,6dibromophenol" insert therefor -- 2,6-dibromophenol -- |
| Column 5, line 25 | Delete "2,5-dichlorphenyl", insert therefor -- 2,5-dichlorophenyl -- |
| Column 7, line 64 | Delete "halogen", insert therefor -- halogenated -- |
| Column 12, line 40 | Delete "was", insert therefor -- were -- |
| Column 12, line 67 | Delete "has", insert therefor -- had -- |

Signed and Sealed this

Sixth Day of August, 1991

Attest:

HARRY F. MANBECK, JR.

Attesting Officer

Commissioner of Patents and Trademarks